United States Patent
Fan et al.

(10) Patent No.: US 7,464,068 B2
(45) Date of Patent: Dec. 9, 2008

(54) SYSTEM AND METHOD FOR CONTINUOUS DIAGNOSIS OF DATA STREAMS

(75) Inventors: Wei Fan, New York, NY (US); Haixun Wang, Tarrytown, NY (US); Philip S. Yu, Chappaqua, NY (US)

(73) Assignee: International Business Machines Corporation, Armonk, NY (US)

(*) Notice: Subject to any disclaimer, the term of this patent is extended or adjusted under 35 U.S.C. 154(b) by 291 days.

(21) Appl. No.: 10/880,913

(22) Filed: Jun. 30, 2004

(65) Prior Publication Data

US 2006/0010093 A1   Jan. 12, 2006

(51) Int. Cl.
*G06F 17/30* (2006.01)

(52) U.S. Cl. .............................. 707/1; 707/5

(58) Field of Classification Search ............... 707/5, 707/6, 1
See application file for complete search history.

(56) References Cited

U.S. PATENT DOCUMENTS

| | | | |
|---|---|---|---|
| 6,442,561 B1* | 8/2002 | Gehrke et al. ............... | 707/102 |
| 6,938,049 B2* | 8/2005 | Kamath et al. .............. | 707/102 |
| 2002/0082886 A1* | 6/2002 | Manganaris et al. ........... | 705/7 |
| 2003/0220860 A1* | 11/2003 | Heytens et al. ................ | 705/35 |
| 2005/0091524 A1* | 4/2005 | Abe et al. .................... | 713/200 |

OTHER PUBLICATIONS

Aggarwal, C.C., A framework for diagnosing changes in evolving data streams, In Proceedings of ACM SIGMO 2003, pp. 575-586, 2003.

Babcock et al., Models and Issues in Dataq Stream Systems, In ACM Symposium on Principles of Database Systems (PODS), 2002.

Babu et al., Continuous queries over data streams, SIGMOD Record, 30:109-120, 2001.

Chen et al., Multi-dimensional regression analysis of time-series data streams, In Proc. of Very Large Database (VLDB), Hongkong, China, 2002.

Domingos et al., Mining high-speed data streams, In Int'l Conf. ofn Knowledge Discovery and Data Mining (SIGKDD), pp. 71-80, Boston, MA, 2000, ACM Press.

Gao et al., Continually evaluating similarity-based pattern queries on a streaming time series, In Int'l Conf. Management of Data (SIGMOD), Madison, WI, Jun. 2002.

Gehrke et al., Boat—Optimistic decision tree construction, In Int'l Conf. Management of Data (SIGMOD), 1999.

(Continued)

*Primary Examiner*—Wilson Lee
*Assistant Examiner*—Binh V Ho
(74) *Attorney, Agent, or Firm*—Ference & Associates LLC

(57) ABSTRACT

In connection with the mining of time-evolving data streams, a general framework that mines changes and reconstructs models from a data stream with unlabeled instances or a limited number of labeled instances. In particular, there are defined herein statistical profiling methods that extend a classification tree in order to guess the percentage of drifts in the data stream without any labelled data. Exact error can be estimated by actively sampling a small number of true labels. If the estimated error is significantly higher than empirical expectations, there preferably re-sampled a small number of true labels to reconstruct the decision tree from the leaf node level.

9 Claims, 5 Drawing Sheets

OTHER PUBLICATIONS

Greenwald et al., Space-efficient online computation of quantile summaries. In Int'l Conf. Management of Data (SIGMOD), pp. 58-66, Santa Barbara, CA, May 2001.

Guha et al., Clustering data streams, In IEEE Symposium on Foundations of Computer Science (FOCS), pp. 359-366, 2000.

Hulten et al., Mining Time-changing data streams, In Int'l Conf. on Knowledge Discovery and Data Mining (SIGKDD), pp. 97-106, San Francisco, CA, 2001, ACM Press.

Shafer et al., Spring: A scalable parallel classifier for data mining, In Proc. of Very Large Database (VLDB), 1996.

Stolfo et al., Credit card fraud detection using meta-learning: Issues and initial results, In AAAI-97 Workshop on Fraud Detection and Risk Management, 1997.

Street et al., A streaming ensemble algorithm (SEA) for large-scale classification, In Int'l Conf. on Knowledge Discovery and Data Mining (SIGKDD), 2001.

Wang et al., Mining concept-drifting data streams using ensemble classifiers, In Proceedings of ACM SIGKDD International Conf. on Knowledge Discovery and Data Mining (SIGKDD), 2003.

* cited by examiner

SYSTEM AND METHOD FOR CONTINUOUS DIAGNOSIS OF DATA STREAMS

FIELD OF THE INVENTION

The present invention relates generally to the mining of time-evolving data streams.

BACKGROUND OF THE INVENTION

Herebelow, numerals in brackets—[ ]—are keyed to the list of references found towards the end of the instant disclosure.

The scalability and accuracy of data mining methods are constantly being challenged by real-time production systems that generate tremendous amount of data continuously at an unprecedented rate. Examples of such data streams include security buy-sell transactions, credit card transactions, phone call records, network event logs, etc. The most important characteristic of streaming data is evolving pattern. Both the underlying true model and distribution of instances evolve and change continuously over time. Streaming data is also characterized by large data volumes. Knowledge discovery on data streams has become a research topic of growing interest [2, 4, 5, 10]. A need has accordingly been recognized in connection with solving the following: given an infinite amount of continuous measurements, how do we model them in order to capture time-evolving trends and patterns in the stream, and make time critical decisions?

Most previous work on mining data streams concentrates on capturing time-evolving trends and patterns with "labeled" data. However, one important aspect that is often ignored or unrealistically assumed is the availability of "class labels" of data streams. Most algorithms make an implicit and impractical assumption that labeled data is readily available. Most works focus on how to detect the change in patterns and how to update the model to reflect such changes. However, for many applications, the class labels are not "immediately" available unless dedicated efforts and subsequent costs are spent to obtain these labels right away. If the true class labels were readily available, data mining models would not be very useful.

To name a few, let us look at credit card fraud detection. In credit card fraud detection, we usually do not know if a particular transaction is a fraud until at least one month later after the account holder receives and reviews the monthly statement. However, if necessary, the true label for a purchase is typically just a phone call away. It is not feasible to verify every transaction, but verifying a small number of suspicious transactions are practical.

As another example, in large organizations, data mining engine normally runs on a data warehouse, while the real-time data streams are stored, processed and maintained on a separate production server. In most cases, the data on the production server is summarized, de-normalized, cleaned up and transferred to the data warehouse periodically such as over night or over the weekend. The true class labels for each transaction are usually kept and maintained in several database tables. It is very hard to provide the true labels to the learner at real time due to volume and quality issues. Nevertheless, the true labels for a small number of transactions can be obtained relatively more easily by running a simple query to the database on these transactions.

Due to these considerations, most current applications obtain class labels and update existing models in preset frequency, usually synchronized with data refresh. As a summary, the life cycle of today's stream data mining tends to be: "given labeled data→train initial model→classify data stream→passively given labeled data→re-train model . . . ". The effectiveness of the algorithm is dictated by some "application-related and static constraints", resulting in a number of potential undesirable consequences that contradict the notions of "streaming" and "continuous". Among these constraints are:

Possible loss due to neglected pattern drifts: If either the concept or data distribution drifts rapidly at an unforecast rate that application-related constraints do not catch up, the models is likely out-of-date on the data stream and important business decisions might be missed or mistakenly made.

Unnecessary model refresh: If there is neither conceptual nor distributional change, periodic passive model refresh and re-validation is a waste of resources.

In view of the foregoing, a general need has been recognized in connection with improving upon the disadvantages and shortcomings presented by known arrangements.

SUMMARY OF THE INVENTION

In accordance with at least one presently preferred embodiment of the present invention, the following framework is proposed in connection with addressing the problems just discussed:

1. Detect potential changes of data streams when the inductive model classifies continuous data streams.
2. Statistically estimate model loss due to changes in data stream by actively sampling minimal number of labeled data records.
3. Reconstruct existing inductive model to reflect the drifts in the data stream by sampling a small number of labeled data instances at the leaf node level.

In summary, one aspect of the invention provides an apparatus for facilitating the mining of time-evolving data streams, said apparatus comprising: an input arrangement for accepting a data stream comprising unlabeled data; and an arrangement for determining an amount of drifts in the data stream comprising unlabeled data; said determining arrangement being adapted to employ a signature profile of an inductive model in determining an amount of drifts in the data stream.

Another aspect of the invention provides a method of facilitating the mining of time-evolving data streams, said method comprising the steps of: accepting a data stream comprising unlabeled data; and determining an amount of drifts in the data stream comprising unlabeled data; said determining step comprising employing a signature profile of an inductive model in determining an amount of drifts in the data stream.

Furthermore, an additional aspect of the invention provides a program storage device readable by machine, tangibly embodying a program of instructions executable by the machine to perform method steps for facilitating the mining of time-evolving data streams, said method comprising the steps of: accepting a data stream comprising unlabeled data; and determining an amount of drifts in the data stream comprising unlabeled data; said determining step comprising employing a signature profile of an inductive model in determining an amount of drifts in the data stream.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1:
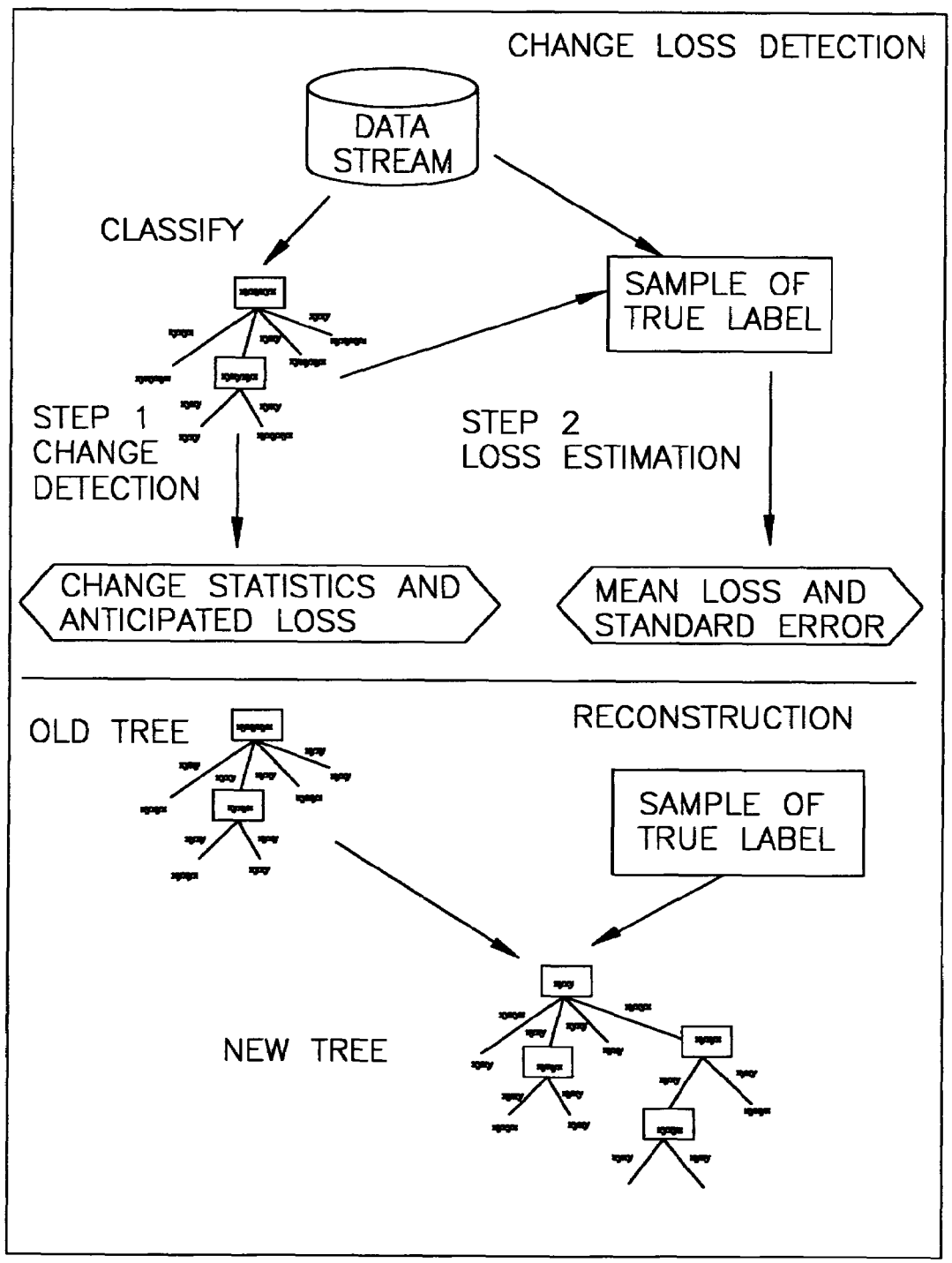
FIG. 1 is a flowchart schematically illustrating an operative framework.

A flow chart which schematically illustrates a framework which may be employed in accordance with a preferred embodiment of the present invention is shown in FIG. 1. Change is detected in two separate steps. We define a few computationally efficient statistics that is correlated with possible changes in the data stream. The statistics do not use the true label of the data stream. These statistics are continuously computed and monitored "on the fly" when the model classifies data streams. When these statistical changes are higher than empirical thresholds, at the second step, a small number of true class labels of the data stream are actively sampled to estimate the loss using random sampling techniques. The loss is expressed in mean and confidence intervals. If the estimated loss of the model on the data stream is more than expected, the model is reconstructed by either updating its a posteriori class probability distribution or minor model reconstruction. Both are preferably implemented by acquiring a small number of true labels from the data stream, including those used in loss estimation. Obtaining a small number of class labels of data stream is feasible. In credit card fraud detection, the true label, i.e., fraud or nonfraud, of a transaction, is typically just a phone call away. Calling to confirm every transaction is impossible, but calling a selected number of transactions is affordable. As another example, querying and providing the true label for every instances is impossible at the production server due to volume and quality issues, however, query a small number of instances is acceptable and feasible.

A "life cycle" of a stream data mining model contemplated in accordance with a preferred embodiment of the present invention can be expressed as: "given training data →train model→classify data stream as well as detect change and estimate loss→actively require small sample→reconstruct model if necessary." This completely transforms the passive mode of stream mining from waiting to be "given label data" into an active mode of "acquiring necessary data."

By way of brief overview, the embodiments of the present invention can contribute to stream data mining in the following ways:

By identifying data availability issues in mining data streams that are either ignored or mistakenly assumed by previously proposed streaming data mining algorithms.

By proposing a framework to solve data availability problem that detects change of the stream and estimates loss as well as reconstruct existing model.

By proposing a new life cycle of stream data mining model that actively and continuously detects changes and updates continuously that is driven by a motivation to reduce loss.

In accordance with a preferred embodiment of the present invention, a classification tree algorithm is extended as a particular example of implementation. However, it should be understood that the embodiments of the present invention in general need not be limited to decision trees only.

Given an unknown target function y=f(x) and a set of examples of this target function {(x, y)}, a classification tree algorithm constructs a decision tree that approximates the unknown target function. Each example x is a feature vector of discrete and continuous values such as age, income, education, and salary. y is drawn from a discrete set of values such as {fraud, nonfraud}. A classification tree or decision tree is a directed acyclic graph (DGA) ordered feature tests. Each internal node of a decision tree is a feature test. Prediction is made at leaf nodes. Decision trees classify examples by sorting them down the tree from the root to some leaf node. Each non-leaf node in the tree specifies a test of some feature of that example. For symbolic or discrete features, each branch descending from the node specifies to one of the possible values of this feature. For continuous values, one branch corresponds to instances with feature value≧the threshold and another one<the threshold. Different instances are classified by different paths starting at the root of the tree ending at a leaf. Some instances, e.g., with missing attribute values etc., may be split among multiple paths. w is the weight of an instance x, it is set to 1.0 initially or other real numbers proportional to the probability that x is sampled. When x splits among multiple paths, the weight is split among different paths usually proportional to the probability of that path. A leaf is a collection of examples that may not be classified any further. Ideally, they may all have one single class, in which case, there is no utility for further classification. In many cases, they may still have different class labels. They may not be classified any further because either additional feature tests cannot classify better or the number of examples are so small that fails a given statistical significance test. In these cases, the prediction at this leaf node is the majority class or the class label with the most number of occurrences. Since each path from the root to a leaf is unique, a decision tree shatters the instance place into multiple leaves.

The performance of a decision is measured by some loss function specifically designed for different applications. Given a loss function $L(t, y)$ where t is the true label and y is the predicted label, an optimal decision tree is one that minimizes the average loss $L(t, y)$ for all examples, weighted by their probability. Typical examples of loss functions in data mining are 0-1 loss and cost-sensitive loss.

For a loss of 0-1, $L(t, y)=0$ if t=y, otherwise $L(t, y)=1$. In cost-sensitive loss, $L(t, y)=c(x, t)$ if t=y, otherwise $L(t, y)=w(x, y, t)$. For many problems, t is nondeterministic, i.e., if x is sampled repeatedly, different values of t may be given. The optimal decision $y_*$ for x is the label that minimizes the expected loss $E_t(L(t,y_*))$ for a given example x when x is sampled repeatedly and different t's may be given. For 0-1 loss function, the optimal prediction is the most likely label or the label that appears the most often when x is sampled repeatedly. For cost-sensitive loss, the optimal prediction is the one that minimizes the empirical risk.

To choose the optimal decision, a posteriori probability is usually required. In a decision tree, assume that $n_c$ is the number of examples or weights with class label c at a leaf node, and n is the total number of examples at the leaf. The a posteriori probability can be estimated as $$P(c|x) = \frac{n_c}{n} \quad (1)$$

Classification tree remains to be one of the most popular inductive learning algorithms in data mining and database community since decision trees can be easily converted into comprehensible if—then rules. One of the biggest problem of classification tree for data streams is that it requires "labelled" instances. In reality, the true labels of data streams are rarely readily available. Next, we will discuss how to estimate the percentage of change without true labels and how to estimate the exact loss due to change and reconstruct the decision tree with limited number of true class labels.

There are three possible types of changes in the data stream, i) distribution change, ii) concept drift as well as iii) combined distribution and concept drift. Preferably, we now will explicitly exclude new symbolic values and new class labels. Given an unknown target function y=f(x) over domain X A "complete" dataset $D_c$ is defined over every possible $x \in X$ with its corresponding y's. A complete dataset is not always possible and is most likely infinite. A training set is typically a sample from the complete dataset. A dataset D of a given size is a sample (usually with replacement) from the complete dataset $D_c$, in which each data point has some prior probability to be chosen. A training dataset D and data stream S have different distribution if the same example has different probability to be chosen by S than by D. A concept drift refers to target function changes, i.e., assume y=g(x) is the target function of the data stream, there exists xsuch that f (x)≠g (x). In reality, data streams may have both distribution and concept drifts. Next, we discuss how distribution and concept changes are reflected in a decision tree's statistics.

We are essentially only interested in defining and studying those statistics "without true class labels" of the data stream. These statistics can be monitored on-the-fly when the decision tree classifies the data stream.

Assume that dt is a decision tree constructed from D. S is a data stream. The examples in the data stream S are classified by a unique path from the root to some leaf node. Assume that $n_l$ is the number of instances classified by leaf l and the size of the data stream is N. We define the statistics at leaf l as $$P(l) = \frac{n_l}{N}$$

Obviously $\Sigma P(l)=1$ summed over all leaf nodes in a tree. P(l) describes how the instance space of the datastream S is shattered among the leaf nodes solely based on attribute test results of a given decision tree dt. It doesn't consider either the true class labels or attributes that is not tested by dt. If the combination of attributes values in the data stream S is different from the training set, it will be reflected in P (t). The change of leaf statistics on a data stream is defined as $$PS = \frac{\sum_{l \in dt} |P_S(l) - P_D(l)|}{2} \times 100\% \quad (3)$$

The increase in P(l) of one leaf is contributed by decrease in at least one other leaf. This fact is taken into account by dividing the sum by 2. When there is significant changes in the data stream, particularly distribution drifts, this statistic is likely to be high.

The effect of drifts on decision trees can also be expressed in loss functions. If S and D have the same distribution, we can use the loss on the training set or hold-out validation set to estimate the "anticipated loss" or $L_a$ on the data stream "without" even looking at the data stream. Assume that the error rate (0-1 loss) on the hold-out validation set is 11%. If there are no drifts on the data stream, the error on the data stream is expected to be around 11%. This 11% error rate conjecture is the "anticipated" loss. For credit card fraud detection, assume that the total money recovered from fraud on a validation set of 10000 transactions is $12000. Then the anticipated total money recovered from a data stream of 5000 transactions is approximately $6000 (=$12000×5000/10000).

$L_a$=validation loss (possibly factored by data size) (4)

On the other hand, rather than a blind conjecture, a better guess takes both the decision tree itself and S's attribute values into account. Consider the number of examples at some leaf node, without any prior knowledge about how the distribution or concept of the examples at this leaf node may have changed or in other words everything is possible, rather than a wild random guess, the best guess is to use the distribution on the training data of this leaf, i.e., P (c|x) as the "expected" or "averaged" probability distribution to estimate the loss on this leaf for the streaming data. Then the loss on the data stream is the cumulative loss of all the leaf nodes of the tree, called "expected loss" or $L_e$. Assume 0-1 loss and the probability of the majority class at some leaf node is 0.7. If the portion of examples in the data stream classified by this node is 30%, the portion of examples in the data stream that are expected to be classified incorrectly is (1-0.7)×30%=9%. We iterate this process for every leaf node in the tree and sum up the expected loss from every node to reach the overall expected loss.

$L_e$=sum of expected loss at every leaf. (5)

Expected loss takes the attribute value of the data stream into account. Examples are sorted into leaf nodes by attribute tests. Leafs classifying more examples in the data stream contribute more to the overall loss. A leaf classifying more examples in the training set may not necessarily classify the same proportion of examples in the data stream due to drifts of the data stream. The difference of anticipated and expected loss is an indicator of the potential change in loss due to changes in the data stream.

$$LS=|L_e-L_a| \quad (6)$$

Although both PS (as defined in Eq (3)) and LS are indicators of the possible drifts in data streams, LS takes the loss function into account.

There are other possible statistics including associations and histograms on the untested attributes at a leaf. An association is the computation of association rules on the tested feature values of examples and their statistics. A drift in data will affect the computed association rules. A histogram is the distribution change of a given feature. A drift in the data even without knowledge of its true label will be reflected in the histogram.

If minimizing loss is the only goal in mining data streams, "loss detection" is more interesting than "change detection" since change does not necessarily increase loss. The above two methods are likelihood indicators since they do not use any true labels of the data stream. A statistically reliable method is to sample a small number of true class labels of the data stream and estimate the expected loss and its standard error. When the expected loss is more than an empirical tolerable threshold with high confidence (as a function of standard error), it warrants that a model reconstruction is required.

The first method is to randomly sample a small number of true labels from the data stream and compute its average loss and standard error. Assume that we have a sample of n examples out of a data stream of size N. The loss on each example is $\{l_1, l_2, \ldots, l_n\}$. From these losses, we compute the average sample loss $$\hat{l} = \frac{l_1 + l_2 + \ldots l_n}{n}$$

and variance $$s^2 = \frac{\sum_1^n (l_i - \hat{l})^2}{n-1}$$

Then the unbiased estimate to the average loss on the stream and its standard error are $\hat{l}$ and $$\frac{s}{\sqrt{n}}$$

respectively. Then the lower and upper confidence limits for mean and total loss on the data stream are as follows:
average loss:

$$\hat{l} - \frac{ts}{\sqrt{n}}\sqrt{1-f}, \quad \hat{l} + \frac{ts}{\sqrt{n}}\sqrt{1-f} \quad (7)$$

total loss:

$$N\hat{l} - \frac{tNs}{\sqrt{n}}\sqrt{1-f}, \quad N\hat{l} + \frac{tNs}{\sqrt{n}}\sqrt{1-f} \quad (8)$$

The symbol t is the value of a normal deviate corresponding to desired confidence probability. The most common values are:

| | | confidence (%) | | |
|---|---|---|---|---|
| 80 | 90 | 95 | 99 | 99.7 |
| 1.28 | 1.64 | 1.96 | 2.58 | 3 |

The symbol f is a fpc or finite population correction factor, it is defined as $$f = \frac{n}{N}.$$

When the size of the data stream is sufficiently large, f can be ignored.

The validity of the above estimates are based on the assumption that the estimate $\hat{l}$ is normally distributed about the corresponding population or the data stream values. When the loss function is 0-1 loss, the actual distribution is binomial. Nonetheless, according to a "central limit theorem," for almost all populations, the sampling distribution of $\hat{x}$ is approximately normal when the simple random sample is sufficiently large. Practically, a sample size of a few hundreds gives a very good approximating to normal distribution.

A "biased" variation of the above random sampling technique is to sample from selected leaf nodes only. One way is to choose a percentage of leaf nodes whose P(l) ranks the highest. This bias is based on the observation that leaf nodes classifying more examples are likely to contribute more to the overall loss.

If the estimated loss is higher than an empirical tolerable threshold, the next step is to reconstruct a decision tree to reduce the empirical loss. We may preferably sample a small number of labelled instances to reconstruct the decision tree. In this connection, we preferably reconstruct the decision tree only at the leaf node levels; both the root and all internal nodes remain the same. The resultant tree may not be as small as a new tree constructed from scratch; it can still be highly accurate since there are more than one models that equally minimize the same loss function. The reconstruction is done through two procedures, updating class probability distribution as well as expanding leaf nodes.

The basic idea is to sample some number of true class labels at the leaf level to estimate the probability distribution of different class labels. When the estimated distribution of the data stream is significantly different from the distribution of the decision tree, the distribution of the decision tree will be updated with the new distribution. At a particular leaf, the probability distribution of class labels is "proportion statistics". For many practical loss-function such as 0-1 loss and cost-sensitive loss, we are essentially only interested in the probability of one class. Assume that p is the probability estimated from the sample that examples classified at this leaf node is of class c, the confidence limits for examples at this leaf to be of class c is $$p \pm \left[ t\sqrt{1-f} \sqrt{pq/(n'-1)} + \frac{1}{2n'} \right] \quad (9)$$

where q=1−p, n' is the number of examples sampled at the leaf, N' is the total number of examples from the data stream that is classified by the leaf, and $$f = \frac{n'}{N'}.$$

Exact methods exist, but this normal approximation is good enough in practice. It is obvious that the standard error is a function of both the estimated probability p and sample size n'. When the difference in distribution is significant with high confidence and the difference results in less loss, the distribution of the sample will replace that in the leaf. Assume that we have two labels {−, +}. The original distribution of in the tree is P (+|x)=0.7 and the prediction will be + since it is the majority label. If the distribution of the sample is p(+|x)=0.4 with confidence limit of 0.1 at 99.7%, we will change the distribution and the majority label will be − instead of +. However if the confidence limit is 0.3, we will either have to sample more instances or keep the original distribution.

Leaf node expansion takes place if the new updated distribution will not improve the loss at the leaf node and consequential overall loss dramatically. For example, under 0-1 loss, if the new distribution is 55% positive, it means that 45% examples classified by this node as positive are actually negative. If more true labels can be sampled, this leaf node will be expanded by recursively calling the same classification tree construction algorithm. In case that we cannot sample more examples or additional feature tests will not distinguish these examples any further, the leaf node will remain as leaf node but with the updating class probability distribution.

As a summary, the main algorithms of the framework are summarized in Algorithm 1.

By way of experimentation, we used the adult dataset from UCI repository. We use the natural split of training and test sets, so the results can be easily replicated. The training set contained 32561 entries and the test set contained 16281 records. The feature set contained 14 features that describe the education, gender, country of origin, martial status, capital gain among others. In order to simulate pattern-drifting streams, we sampled different portions of positives and negatives to generate the new data stream, i.e., {10/90, 20/80, . . . ,90/10}.

We had one training set and a series of data stream chucks with an increasing percentage of either distribution or concept drifts from the original training set. An original classification tree was constructed from the original training set. Then the series of data stream chunks were applied on this original classification tree to i) compute the correlation of leaf change statistics and expected loss with the percentage of change ii) estimate true loss by sampling a small number of instances from the data stream chunk iii) and reconstruct the original decision tree by sampling from the data stream chunk.

Herebelow are discussed the results of using the extended decision tree algorithm to detect changes in patterns and overall loss in the data stream, estimate the loss by randomly sampling a small number of true labels from the data stream, and reconstruct the original decision tree by either updating class probability distribution in leaf nodes or extending leaf nodes in the tree.

Figure 2:
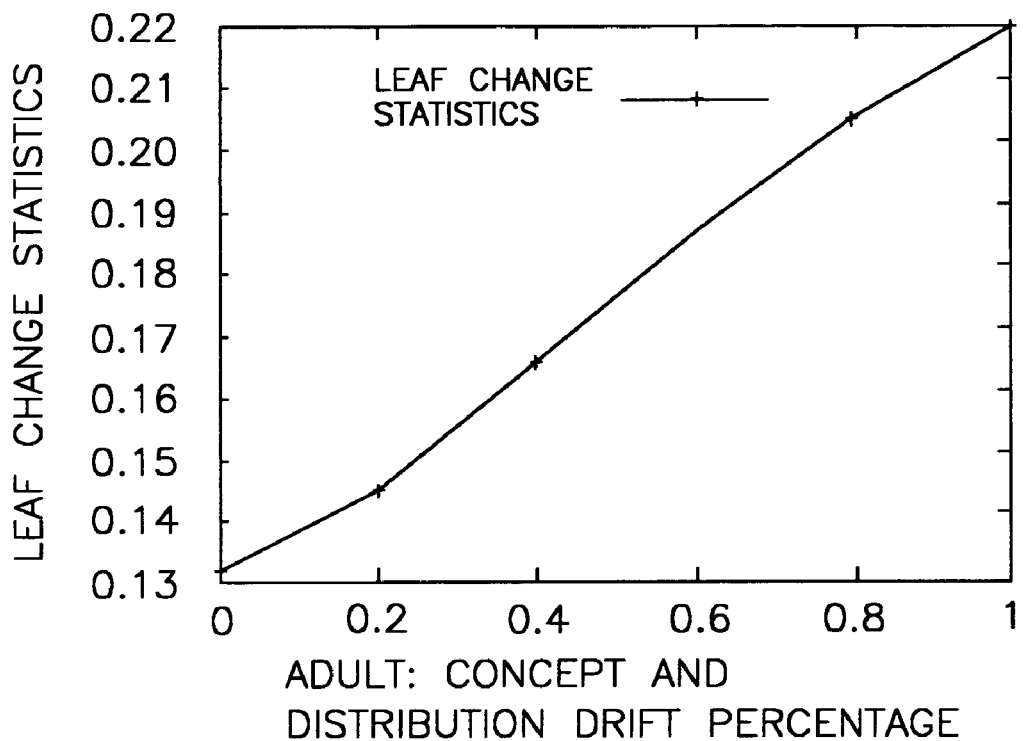
FIG. 2 is a plot of the correlation of leaf change statistics and true loss.

The correlation of leaf change statistics and true loss is plotted in FIG. 2. In the plot, the x-axis is the change percentage of the data stream. In other words, a change percentage of 20% means that 20% of the data in the data stream have pattern drifts from the training data of the original decision tree. The y-axis is the calculated percentage change of leaf statistics (P S) as defined in Eq (3). The plot is computed by using the "same decision tree" to classify data streams with evolving drifts. As shown in all three plots, the P S statistics is linearly correlated with the change in the data stream. This empirical evaluation means that leaf changing statistics is a good indicator of the amount of change in the data stream.

Figure 3:
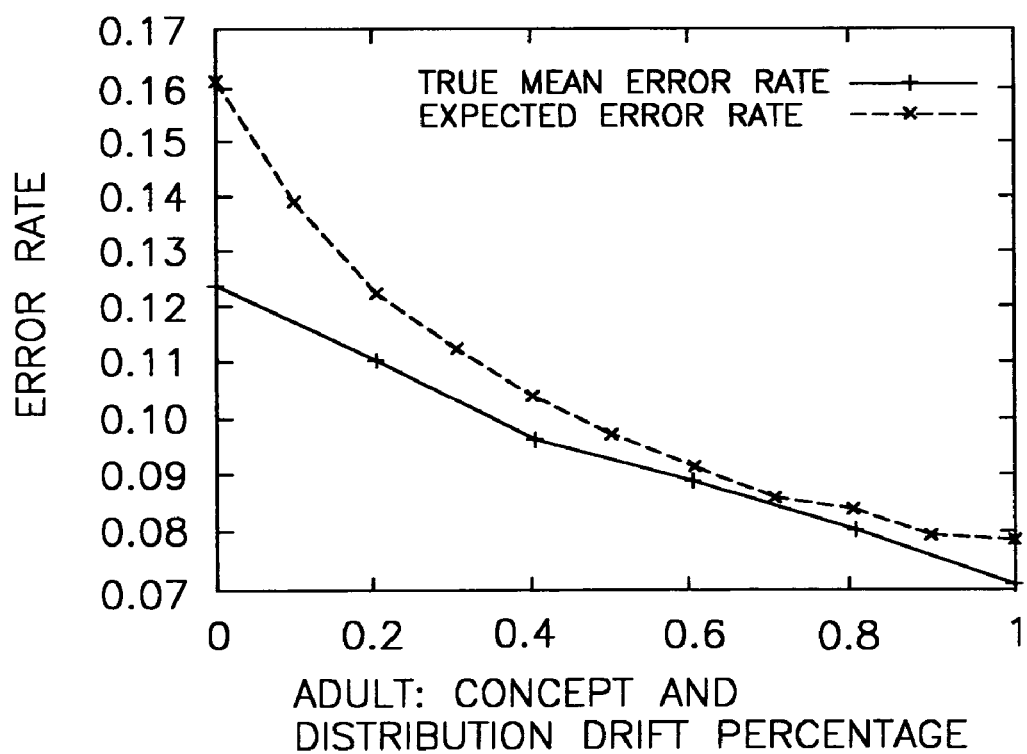
FIG. 3 is a plot of the correlation between expected loss and true loss.

The correlation between expected loss $L_e$ (as defined in Eq (5)) and the true loss as a function of the percentage of change is shown in FIG. 3. The x-axis is the percentage of change in the data stream and y-axis is the loss (or average benefits for credit card fraud dataset). As clearly shown in the plots, expected loss and true loss are positively correlated consistently when the changing ratio increases. The reason the 0-1 loss error rate is decreasing is that the data stream have more and more data of one class and they are more and more classified by a few leaf nodes that only have one single class.

Figure 4A:
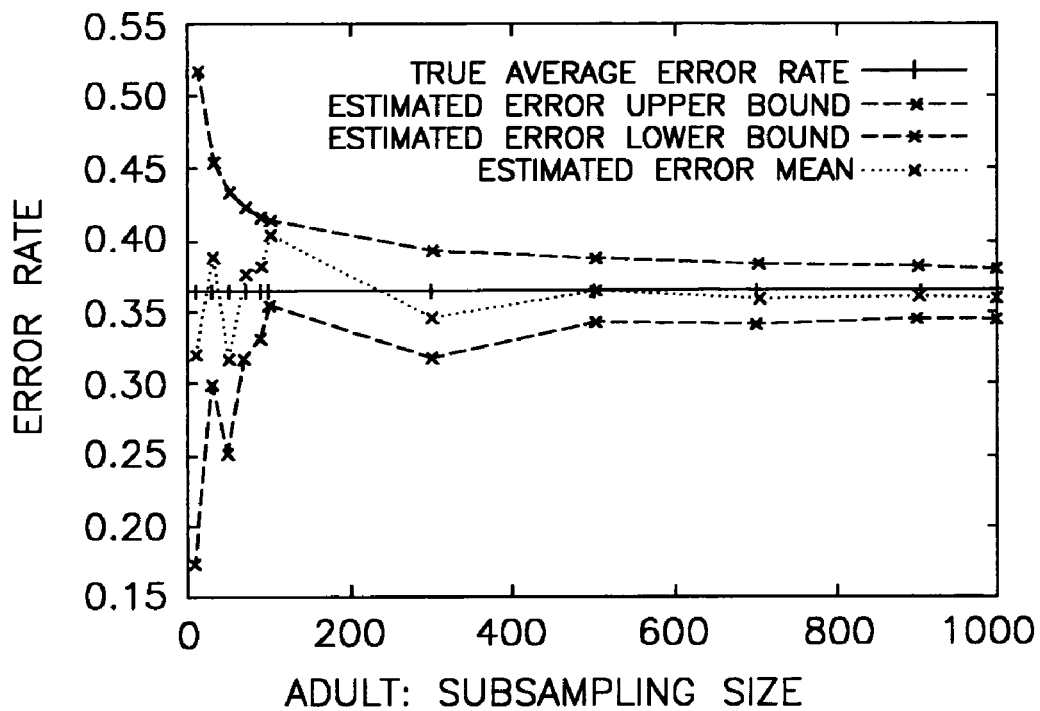
FIGS. 4a and 4b provide plots on loss estimation.
Figure 4B:
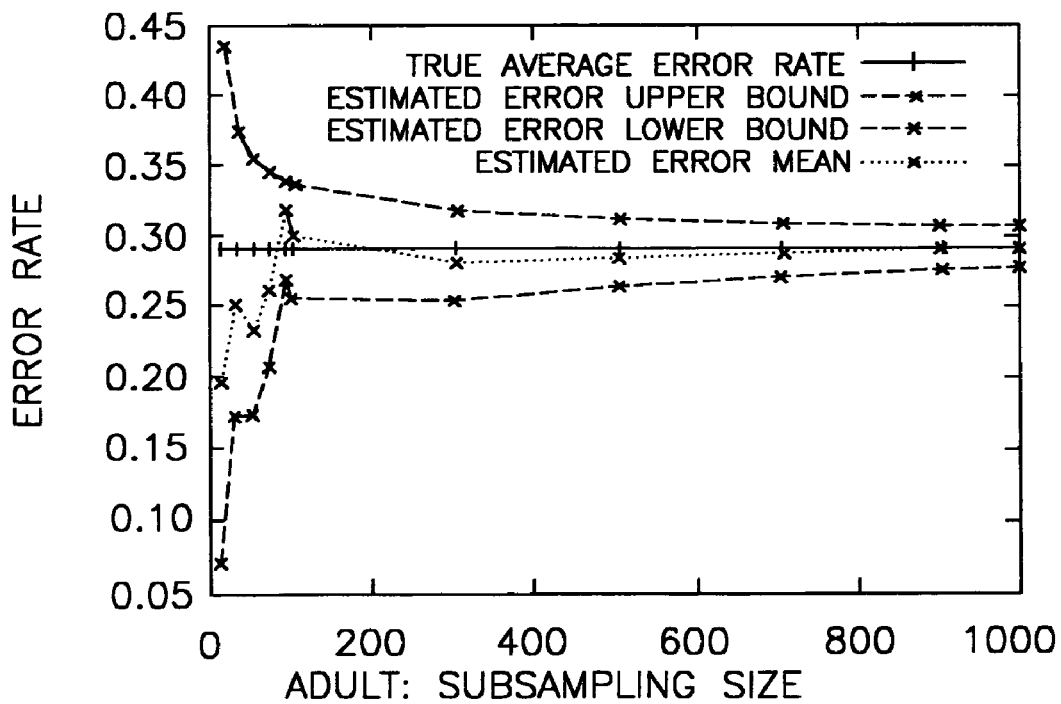

The plots on loss estimation are shown in FIGS. 4a and 4b. There are 2 different changing ratios in the data stream, one minor and one major corresponding to the top and bottom plots. We have sampled up to 1000 instances in the data stream. There are 4 curves in each plot: the true loss on the data stream, the estimated mean loss; and the upper and lower bounds at 99.7% confidence or three times the standard error. As we can see from the plots, the estimated mean loss at sample size of around 200 to 300 already give very close estimation to the true loss on the complete data stream.

Figure 5:
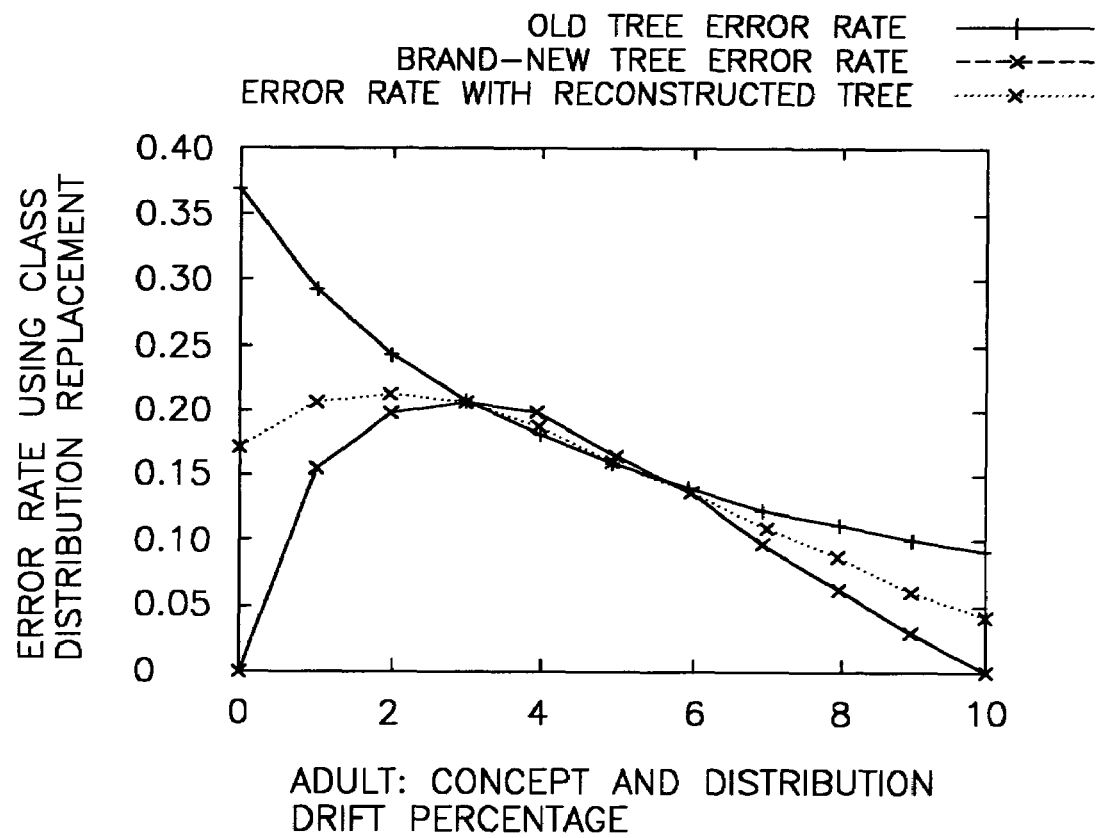
FIG. 5 provides plots on tree reconstruction via the replacement of class distribution at leaf nodes.

The plots on tree reconstruction by replacing the class distribution at the leaf nodes are drawn in FIG. 5. The total number of examples sampled is 10% of the new data stream. There are three curves in each plot. The curve on the top is the loss of the original decision tree on the new data stream. The curve in the middle is the loss of the reconstructed decision tree, and the curve at the bottom is the loss of the new decision tree trained from the data stream itself. The obvious observation is that the reconstructed decision tree is significantly lower in loss than the original decision tree and very close to the performance of the completely re-trained decision tree.

Figure 6:
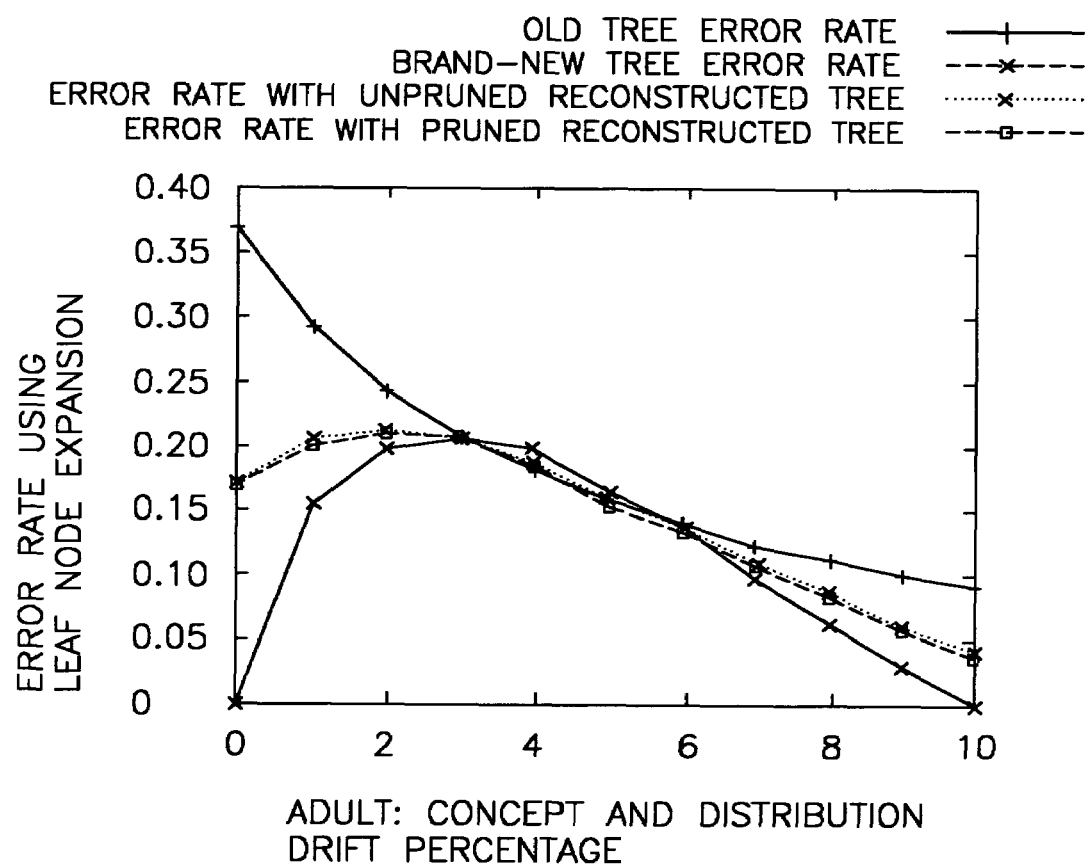
FIG. 6 provides plots on tree reconstruction via leaf node expansion.

The plots on tree reconstruction via leaf node expansion are shown in FIG. 6. All results were run by sampling 30% of true labels from the data stream. There are 4 curves in each plot; the loss of the original decision tree on the data streams, the loss of the reconstructed decision by leaf node expansion (either unpruned or pruned after expansion), and the loss of the newly trained decision tree on the complete data stream. A reconstructed pruned decision tree removes statistically insignificant expansions of a reconstructed unpruned decision tree. There are a few observations from the plots. A reconstructed decision tree is more accurate than the original decision tree. Pruned reconstructed decision tree is more accurate than unpruned reconstructed decision tree in general. Comparing with FIG. 5, reconstruction via leaf node expansion is more accurate than reconstruction via class distribution replacement only for the synthetic dataset. Leaf node expansion and class probability replacement results are very similar.

By way of brief recapitulation, the mining of time-evolving data streams has recently become an important and challenging task for a wide range of applications, such as trading surveillances, fraud detection, target marketing, intrusion detection, etc. Most previously proposed data stream mining methods concentrate on continuously detecting changes and reconstructing models from "labelled" data streams, i.e., on the collection of data that are clearly marked as either positive or negative. They make an implicit and unrealistic assumption that "labelled" data stream is readily available and can be mined at anytime. Due to both application-related and monetary constraints, data mining models work on unlabeled instances or a limited number of labelled instances in most of the time. When there are no labelled data or only a small number of labelled instances, most existing methods fail to either detect any change or reconstruct the model. When there is actually no significant change in the data stream, obtaining true class labels and subsequently updating the model are wasteful. On the other hand, when unforeseen changes in the data stream do result in error significantly higher than what is expected, it is important to detect such changes and update the model immediately. A periodic "canned" model refresh is insufficient and ineffective. This problem is worsened when data volume increases. In accordance with at least one presently preferred embodiment of the present invention, there is proposed a general framework that mines changes and reconstructs models from a data stream with unlabeled instances or a limited number of labeled instances. In particular, there are defined herein a few statistical profiling methods that extend the classification tree in order to guess the percentage of drifts in the data stream without any labelled data. Exact error can be estimated by actively sampling a small number of true labels. If the estimated error is significantly higher than empirical expectations, we re-sample a small number of true labels to reconstruct the decision tree from the leaf node level.

It is to be understood that the present invention, in accordance with at least one presently preferred embodiment, includes an input arrangement for accepting a data stream comprising unlabeled data and an arrangement for determining an amount of drifts in the data stream comprising unlabeled data. Together, these elements may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

REFERENCES

1. C. C. Aggarwal. A framework for diagnosing changes in evolving data streams. In *Proceedings of ACM SIGMO* 2003, pages 575-586, 2003.
2. B. Babcock, S. Babu, M. Datar, R. Rotawani, and J. Widom. Models and issues in data stream systems. In *ACM Symposium on Principles of Database Systems (PODS)*, 2002.
3. S. Babu and J. Widom. Continurous queries over data streams. *SIGMOD Record*, 30:109-120, 2001.
4. Y. Chen, G. Dong, J. Han, B. W. Wah, and J. Wang. Multidimensional regression analysis of time-series data streams. In *Proc. Of Very Large Database (VLDB)*, Hongkong, China, 2002.
5. P. Domingos and G. Hulten. Mining high-speed data streams. In *Int'l Conf. On Knowledge Discovery and Data Mining (SIGKDD)*, pages 71-80, Boston, Mass., 2000. ACM Press.
6. L. Gao and X. Wang. Continually evaluating similarity-based pattern queries on a streaming time series. In *Int'l Conf. Management of Data (SIGMOD)*, Madison, Wis., June 2002.
7. J. Gehrke, V. Ganti, R. Ramakrishnan, and W. Loh. BOAT-optimistic decision tree construction. In *Int'l Conf. Management of Data (SIGMOD)*, 1999.
8. M. Greenwald and S. Khanna. Space-efficient online computation of quantile summaries. In *Int'l Conf. Management of Data (SIGMOD)*, pages 58-66, Santa Barbara, Calif., May 2001.
9. S. Guha, N. Milshra, R. Motwani, and L. O'Callaghan. Clustering data streams. In *IEEE Symposium on Foundations of Computer Science (FOCS)*, pages 359-366, 2000.
10. G. Hulten, L. Spencer, and P. Domingos. Mining time-changing data streams. In *Int'l Conf. On Knowledge Discovery and Data Mining (SIGKDD)*, pages 97-106, San Francisco, Calif., 2001. ACM Press.
11. J. R. Quinlan. C4.5: *Programs for Machine Learning*. Morgan Kaufmann, 1993.
12. C. Shafer, R. Agrawal, and M. Mehta. Spriint: A scalable parallel classifier for data mining. In *Proc. Of Very Large Database (VLDB)*, 1996.
13. S. Stolfo, W. Fan, W. Lee, A. Prodromidis, and P. Chan. Credit card fraud detection using meta-learning: Issues and initial results. In AAAI-97 *Workshop on Fraud Detection and Risk Management*, 1997.
14. W. N. Street and Y. Kim. A streaming ensemble algorithm (SEA) for large-scale classification. In *Int'l Conf. On Knowledge Discovery and Data Mining (SIGKDD)*, 2001.
15. H. Wang, W. Fan, P. Yu, and J. Han. Mining concept-drifting data streams with ensemble classifiers. In *to appear in Proceedings of ACM SIGKDD International Conference on knowledge discovery and data mining (SIGKDD2003)*, 2003.

What is claimed is:

1. An apparatus for facilitating the mining of time-evolving data streams, said apparatus comprising: an input arrangement for accepting a data stream comprising unlabeled data; and an arrangement for determining an amount of drifts in the data stream comprising unlabeled data; said determining arrangement: employs a signature profile of an inductive model in determining an amount of drifts in the data stream; reconstructs the inductive model via actively acquiring true labels for a small sample of the unlabeled data in the data stream in order to estimate loss, wherein the inductive model is reconstructed if the estimated loss is more than an empirically determined threshold; and employs statistical measures to estimate the error rate of the inductive model; wherein reconstruction of an original decision tree comprises at least one of: updating a class probability distribution in leaf nodes in the tree; and extending leaf nodes in the tree.

2. The apparatus according to claim 1, wherein said determining arrangement determines a percentage of drifts in the data stream.

3. The apparatus according to claim 1, wherein said determining arrangement employs a signature profile in reconstructing the inductive model via minor model replacement.

4. The apparatus according to claim 1, wherein said determining arrangement employs statistical measures to define the profile of the inductive model.

5. A method of facilitating the mining of time-evolving data streams, said method comprising the steps of: accepting a data stream comprising unlabeled data; and determining an amount of drifts in the data stream comprising unlabeled data; said determining step comprising: employing a signature profile of an inductive model in determining an amount of drifts in the data stream; reconstructing the inductive model via actively acquiring true labels for a small sample of the unlabeled data in the data stream in order to estimate loss, wherein the inductive model is reconstructed if the estimated loss is more than an empirically determined threshold; and employing statistical measures to estimate the error rate of the inductive model; wherein reconstruction of an oriciinal decision tree comprises at least one of: updating a class probability distribution in leaf nodes in the tree; and extending leaf nodes in the tree.

6. The method according to claim 5, wherein said determining step comprises determining a percentage of drifts in the data stream.

7. The method according to claim 5, wherein said employing step comprises employing a signature profile in reconstructing the inductive model via minor model replacement.

8. The method according to claim 5, wherein said determining step comprises employing statistical measures to define the profile of the inductive model.

9. A program storage device readable by machine, tangibly embodying a program of instructions executable by the machine to perform method steps for facilitating the mining of time-evolving data streams, said method comprising the steps of: accepting a data stream comprising unlabeled data; and determining an amount of drifts in the data stream comprising unlabeled data; said determining step comprising: employing a signature profile of an inductive model in determining an amount of drifts in the data stream; reconstructing the inductive model via actively acquiring true labels for a small sample of the unlabeled data in the data stream in order to estimate loss, wherein the inductive model is reconstructed if the estimated loss is more than an empirically determined threshold; and employing statistical measures to estimate the error rate of the inductive model; wherein reconstruction of an original decision tree comprises at least one of: updating a class probability distribution in leaf nodes in the tree; and extending leaf nodes in the tree.

* * * * *